(12) United States Patent
Chen et al.

(10) Patent No.: US 8,347,461 B2
(45) Date of Patent: Jan. 8, 2013

(54) SLIDE COVER MOUNTING STRUCTURE

(75) Inventors: Chia Hui Chen, Taoyuan (TW); Che-Hsien Lin, Taoyuan (TW); Tzu-Yu Lin, Taoyuan (TW)

(73) Assignee: Lianhong Art Co., Ltd., Taoyuan (TW)

( * ) Notice: Subject to any disclaimer, the term of this patent is extended or adjusted under 35 U.S.C. 154(b) by 259 days.

(21) Appl. No.: 12/986,363

(22) Filed: Jan. 7, 2011

(65) Prior Publication Data

US 2012/0175478 A1    Jul. 12, 2012

(51) Int. Cl.
*E05D 7/00* (2006.01)
*E05D 3/06* (2006.01)

(52) U.S. Cl. ............... 16/354; 16/366; 16/357; 16/327

(58) Field of Classification Search .......... 16/327, 16/331, 333, 338, 340, 366, 354, 357, 360, 16/346, 345, 368, 369; 361/679.08, 679.11, 361/679.02, 679.15, 679.27, 679.21, 679.09, 361/679.22; 455/90.3, 575.1, 575.3, 575.8; 379/433.12, 433.13; 348/373, 333.01, 333.06, 348/794; 248/274.1, 284.1, 286.1, 287.1, 248/419, 420

See application file for complete search history.

(56) References Cited

U.S. PATENT DOCUMENTS

| | | | | |
|---|---|---|---|---|
| 4,146,320 A * | 3/1979 | Schrader | ......................... | 396/145 |
| 5,102,084 A * | 4/1992 | Park | ............................ | 248/286.1 |
| 5,168,426 A * | 12/1992 | Hoving et al. | ........... | 361/679.09 |
| 5,548,478 A * | 8/1996 | Kumar et al. | ............ | 361/679.27 |
| 6,091,600 A * | 7/2000 | Jeong | ........................ | 361/679.12 |
| 6,163,451 A * | 12/2000 | Chiu | ............................ | 361/679.22 |
| 6,247,242 B1* | 6/2001 | Sujino | .............................. | 33/706 |
| 6,748,249 B1* | 6/2004 | Eromaki et al. | ........... | 455/575.4 |
| 7,677,509 B2* | 3/2010 | Jang | ............................. | 248/176.1 |
| 2005/0078818 A1* | 4/2005 | Bae | .......................... | 379/433.13 |
| 2005/0225934 A1* | 10/2005 | Homer et al. | ................. | 361/683 |
| 2007/0180657 A1* | 8/2007 | Zeilbeck et al. | ................ | 16/354 |
| 2010/0027224 A1* | 2/2010 | Wang et al. | .................... | 361/728 |
| 2010/0299873 A1* | 12/2010 | Song | .............................. | 16/236 |
| 2011/0216483 A1* | 9/2011 | Vesely | ..................... | 361/679.01 |
| 2012/0175478 A1* | 7/2012 | Chen et al. | .................. | 248/286.1 |

FOREIGN PATENT DOCUMENTS

| CN | 201716622 U | * | 1/2011 |
|---|---|---|---|
| JP | 07208046 A | * | 8/1995 |
| JP | 09188203 A | * | 7/1997 |
| JP | 2004029953 A | * | 1/2004 |
| JP | 2007206283 A | * | 8/2007 |

* cited by examiner

*Primary Examiner* — Chuck Y. Mah
(74) *Attorney, Agent, or Firm* — Guice Patents PLLC (57) ABSTRACT

Used in an electronic device comprising a cover panel and a base member, a slide cover mounting structure includes two hinges bilaterally mounted on the top wall of the base member, two sliding rail holders respectively connected to the pivot shafts of the hinges, two sliding rails bilaterally mounted on the bottom surface of the cover panel and respectively slidably coupled to a sliding groove on each of the sliding rail holder, two gears pivotally connected between fixed rails on the sliding rail holders, and two gear racks respectively mounted on the cover panel and meshed with the gears. Thus, the cover panel is prohibited from biasing during sliding movement, and turnable about the pivot shafts of the hinges from a horizontal position to a tilted position relative to the base member.

5 Claims, 8 Drawing Sheets

SLIDE COVER MOUNTING STRUCTURE

BACKGROUND OF THE INVENTION

1. Field of the Invention

The present invention relates to slide cover mounting technology and more particularly, to a slide cover mounting structure for use in an electronic device, for example, tablet computer, for allowing a top cover to be moved horizontally relative to a base panel and then lifted from a horizontal position to a tilted position.

2. Description of the Related Art

Following development and function improvement of touch control technology, tablet computer has become popular. The LCD screen of a tablet computer is located on the outer surface of the computer for convenient operation.

However, the use of a keyboard is a common practice to most people for, for example, text word input. There are tablet computers that comprise an operating system end arranged at the bottom side of the LCD display panel. Thus, the LCD display panel can be moved horizontally relative to the operating system end and then lifted to a tilted position so that the user can use the keyboard on the operating system end.

To satisfy this operation, a special slide cover mounting arrangement is necessary. The known slide cover mounting arrangement comprises a pair of hinges, a pair of sliding rail holders and sliding rails. However, this design does not allow smooth lifting of the LCD display panel. Gear and gear rack may be added to distribute the applied push force evenly. However, the gear will be disengaged from the gear rack when the user lifts the LCD display panel from the operating system end, and will be pushed back into engagement with the gear rack when the user closes the LCD display panel. Because the gear is not constantly kept in mesh with the gear rack, the LCD display panel may be erroneously biased from position.

SUMMARY OF THE INVENTION

The present invention has been accomplished under the circumstances in view. It is the main object of the present invention to provide a slide cover mounting structure, which eliminates the drawbacks of the aforesaid prior art design.

To achieve this and other objects of the invention, a slide cover mounting structure is used in an electronic device comprising a cover panel and a base member. The slide cover mounting structure comprises two hinges respectively fixedly mounted in a respective recessed portion on a middle part of a top wall of the base member adjacent to two opposite lateral sides of the base member, each hinge comprising a pivot shaft; two sliding rail holders respectively connected to the pivot shafts of the two hinges and rotatable relative to the base member, each sliding rail holder comprising a sliding groove; two sliding rails bilaterally fixedly mounted on a bottom surface of the cover panel in a parallel manner and respectively slidably coupled to the sliding grooves of the sliding rail holder; two gears, each gear comprising a fixed gear shaft pivotally connected between the fixed rails of one sliding rail holder; and two gear racks respectively mounted on the bottom surface of the cover panel in a parallel manner and respectively meshed with the gears. The two sliding rails are moved with the cover panel in the sliding grooves of the sliding rail holders relative to the base member when the cover panel receives a horizontal push force, and the gear racks are simultaneously moved with the cover panel to rotate the gears, enabling the horizontal push force to be transferred through the fixed gear shafts of the gears to two opposite lateral sides of the base member to prohibit the cover panel from biasing during sliding movement. The gears are constantly kept meshed with the gear racks for enabling the cover panel to be turned about the pivot shafts of the hinges from a horizontal position to a tilted position relative to the base member.

Further, rollers are respectively pivotally mounted in two opposing front corners of the top wall of the base member and two opposing rear corners of the bottom surface of the cover panel for enabling a constant sliding gap to be kept between the cover panel and the base member to prevent the cover panel from biasing relative to the base member when the cover panel is moved horizontally relative to the base member.

Thus, the slide cover mounting structure of the invention has advantages as follows:

1. When used in a tablet computer, the two rollers at the base member and the two rollers at the cover panel keep a constant sliding gap between the cover panel and the base member, avoiding biasing of the cover panel during its sliding movement.

2. Subject the effect of the gears and the gear racks and the connection arrangement of the fixed gear shafts of the between the gears, applied horizontal push force can be evenly transferred from the cover panel to the two opposite lateral sides of the base member, avoiding biasing of the cover panel during its sliding movement.

3. Subject to connection between the fixed gear shafts of the two gears and the two sliding rail holders, the cover panel is constantly kept in balance when moved.

4. The gears are constantly kept in mesh with the respective gear racks, avoiding accidental disengagement when lifting the cover panel.

DETAILED DESCRIPTION OF THE PREFERRED EMBODIMENT

Figure 1:
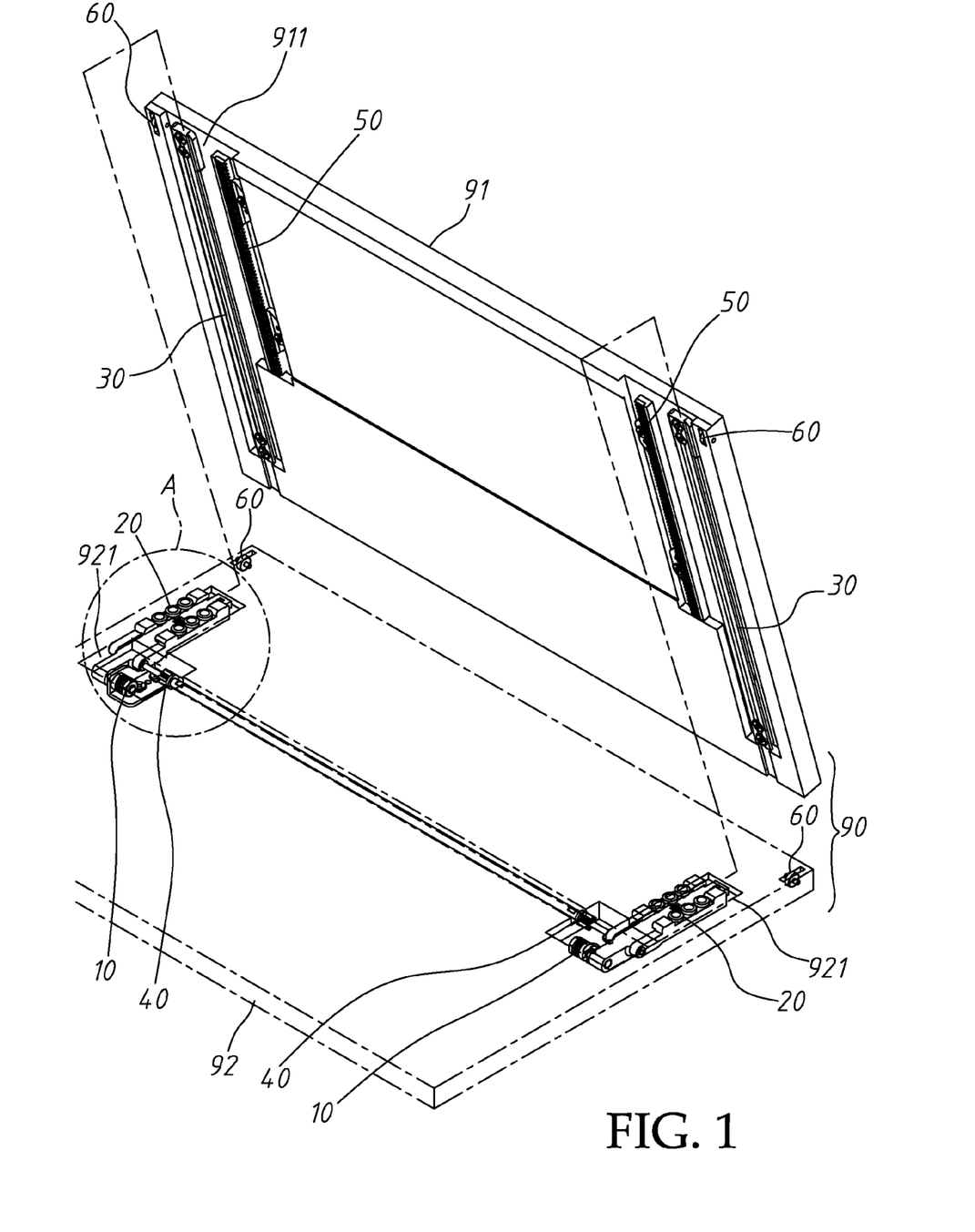
FIG. 1 is an exploded view of a slide cover mounting structure used in a tablet computer in accordance with the present invention.

Referring to FIG. 1, a slide cover mounting structure in accordance with the present invention is shown used in an electronic device 90 comprising a cover panel 91 and a base member 92. The electronic device 90 can be, for example, a tablet computer. The cover panel 91 is a LCD display panel. The base member 92 is the operating system end of the electronic device 90, comprising a keyboard. The slide cover mounting structure comprises a pair hinges 10, a pair of sliding rail holders 20, a pair of sliding rails 30, a pair of gears 40 and a pair of gear racks 50.

Figure 1A:
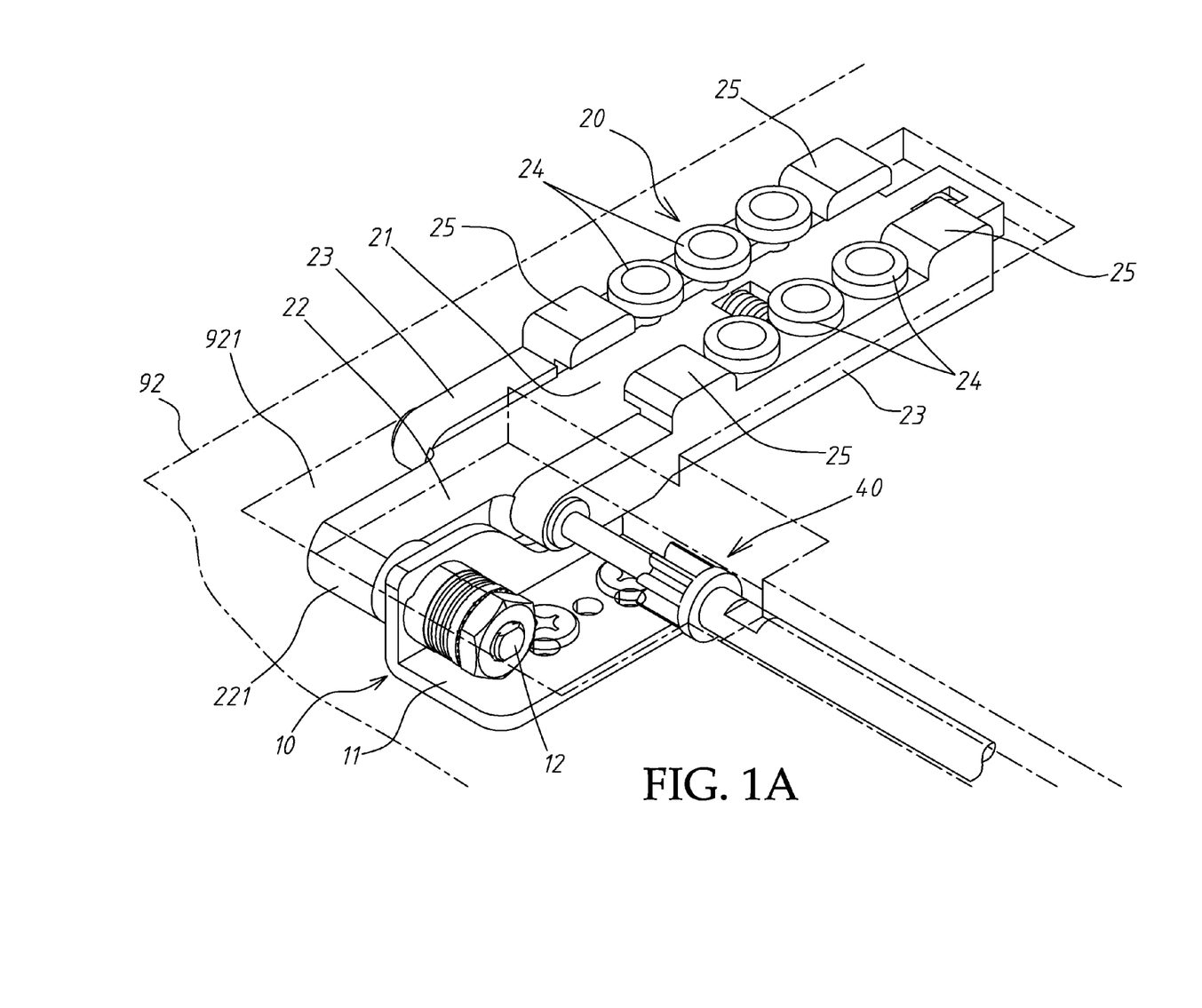
FIG. 1A is an enlarged view of part A of FIG. 1.

Referring also to FIG. 1A, the hinges 10 are respectively fixedly mounted in a respective recessed portion 921 on a middle of the top wall of the base member 92 adjacent to the two opposite lateral sides of the base member 92, each comprising a pivot shaft 12.

The sliding rail holders 20 are respectively connected to the pivot shafts 12 of the hinges 10 and rotatable relative to the base member 92, each comprising a bottom plate 22, which has a rear end 221 fixedly connected to the pivot shaft 12 of one of the hinges 10 for synchronous rotation with the associating pivot shaft 12 to position in any angle, two fixed rails 23 fixedly mounted on the top wall of the bottom plate 22 in a parallel manner, a sliding groove 21 defined at the top wall of the bottom plate 22 between the two fixed rails 23, two pairs of protruding blocks 25 respectively located on the fixed rails 23 at the top side and partially suspending above the sliding groove 21, and a plurality of rollers 24 respectively pivotally mounted on the top wall of each of the fixed rails 23 between the associating pair of protruding blocks 25.

Figure 2:
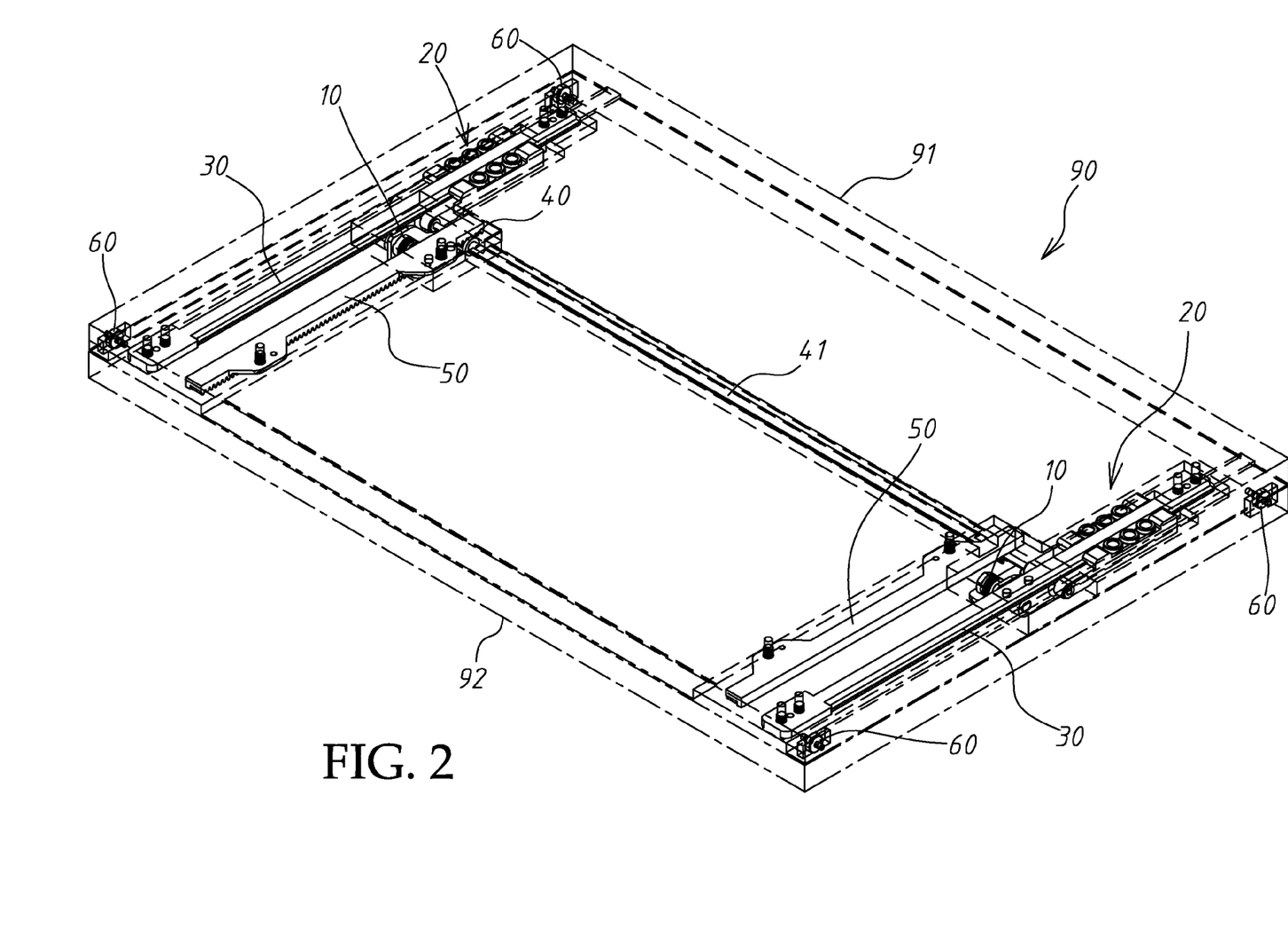
FIG. 2 is a perspective assembly view of FIG. 1.
Figure 3:
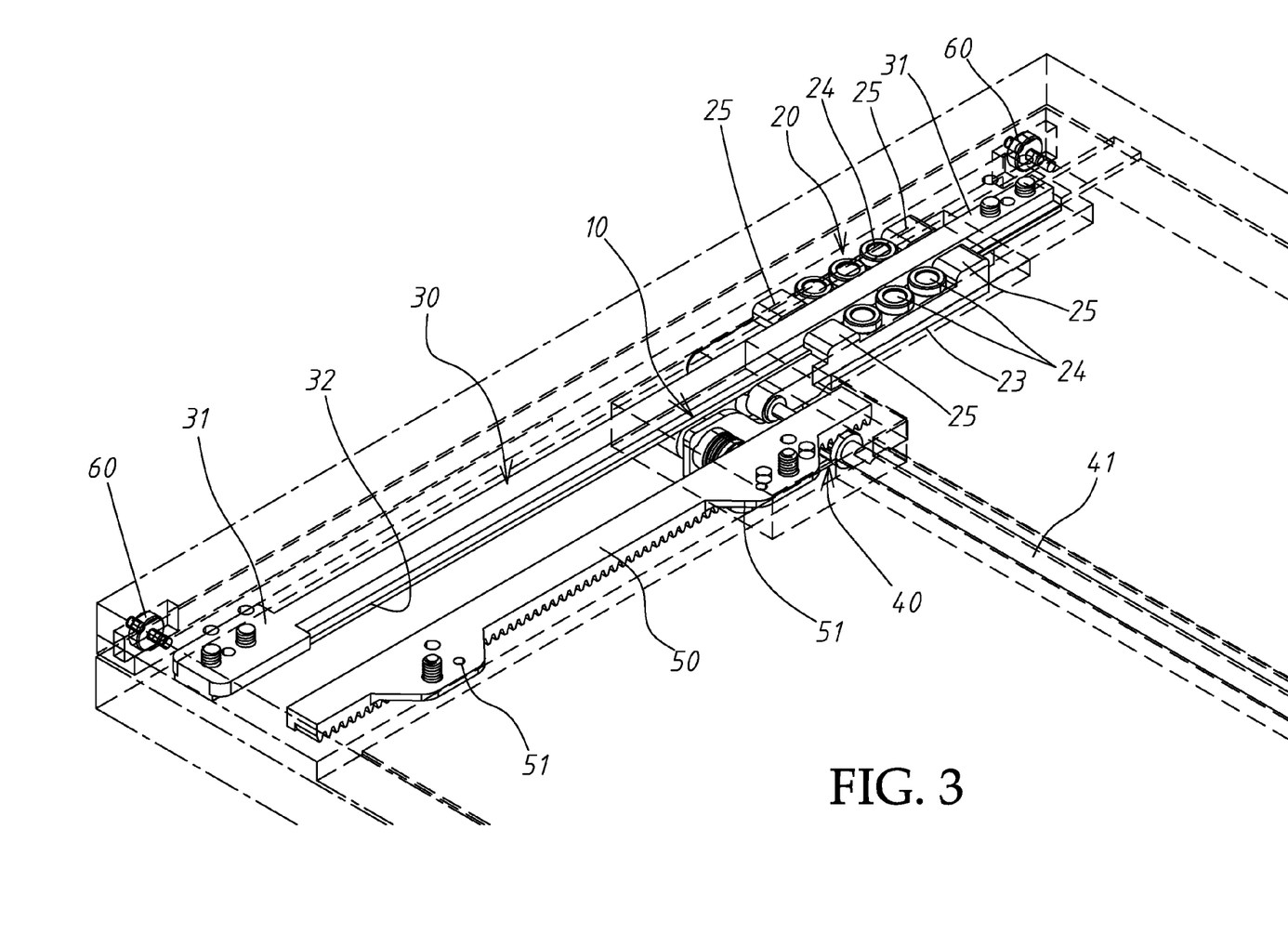
FIG. 3 is an enlarged view of the left part of FIG. 2.

Referring also to FIG. 2, the sliding rails 30 are bilaterally fixedly mounted on the bottom surface of the cover panel 91 in a parallel manner, and respectively slidably coupled to the sliding grooves 21 of the sliding rail holders 20. As illustrated in FIG. 3, each sliding rail 30 comprises two end blocks 31 respectively located on the two distal ends thereof and affixed to one respective recessed portion 911 on the bottom surface of the cover panel 91 (see FIG. 1), and two side flanges 32 extending along the length in flush with the bottom wall thereof. When the sliding rails 30 are respectively inserted into the sliding grooves 21 of the sliding rail holders 20, the side flanges 32 of each sliding rail 30 are stopped below the protruding blocks 25 of the associating sliding rail holder 20 in the associating sliding groove 21, and each sliding rail 30 is supported between the two rows of rollers 24 on the fixed rails 23 of the associating sliding rail holder 20.

The gears 40 are respectively mounted on a respective fixed gear shaft 41, which has two distal ends thereof respectively pivotally connected between the fixed rails 23 of the sliding rail holders 20.

The gear racks 50 are respectively set in the recessed portions 911 on the bottom surface of the cover panel 91 in a parallel manner, and respectively meshed with the gears 40, each having two protruding mounting flanges 51 disposed at one side and affixed to the bottom surface of the cover panel 91.

Figure 4:
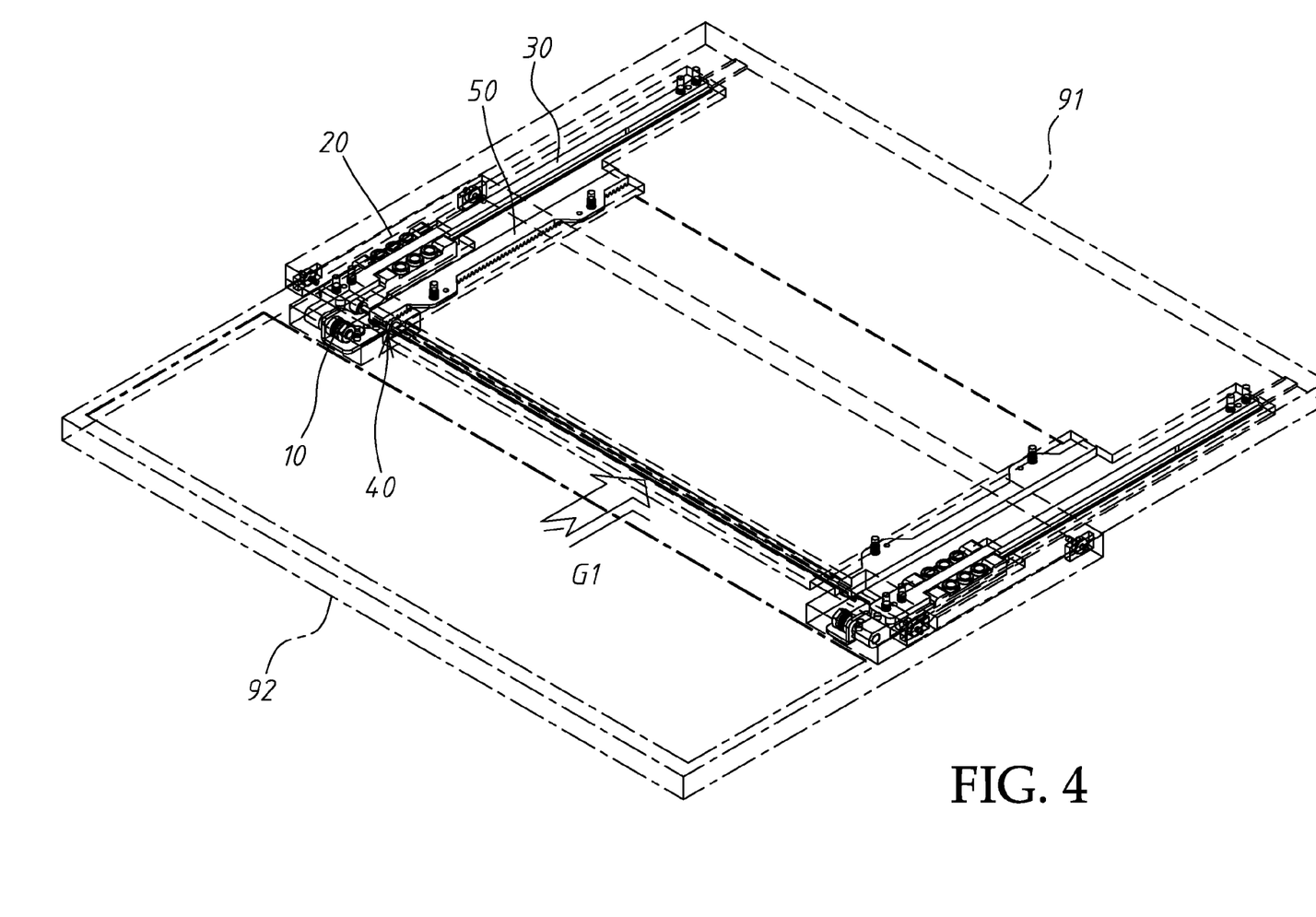
FIG. 4 is a schematic drawing of the present invention, illustrating the cover panel moved horizontally relative to the base member.

As stated above, the slide cover mounting structure of the present invention is used in an electronic device 90. When the cover panel 91 receives a horizontal push force, it will slide forwards relative to the base member 92, as indicated by arrowhead sign G1 in FIG. 4. At this time, the sliding rails 30 are moved in the sliding grooves 21 of the associating sliding rail holders 20, and at the same time, the gear racks 50 are forced to rotate the gears 40, enabling the horizontal push force to be evenly transferred through the gear shafts 41 to the two opposite lateral sides of the base member 92, avoiding biasing of the cover panel 91 during its sliding movement.

Figure 5:
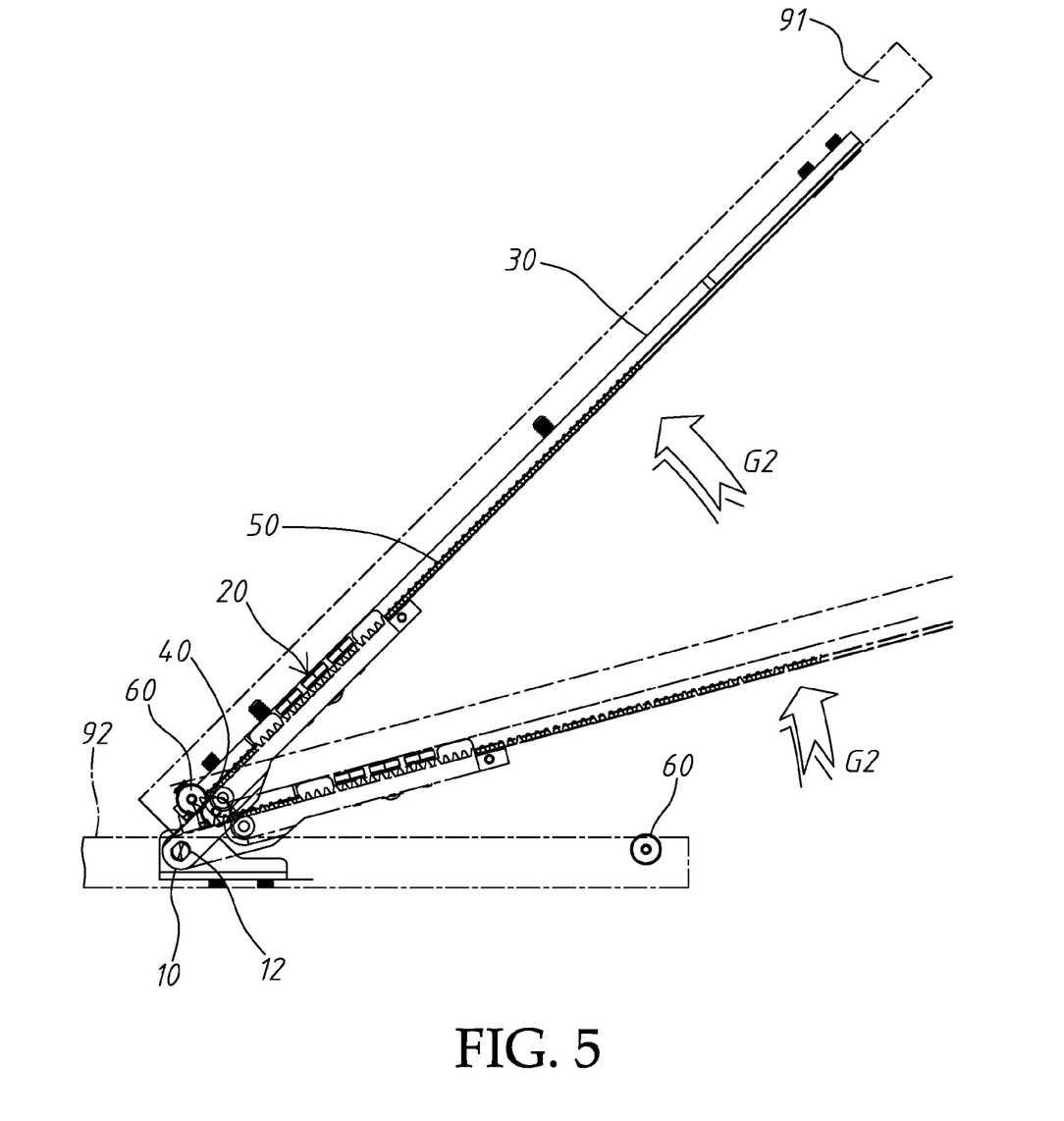
FIG. 5 is a schematic drawing of the present invention, illustrating a lifting operation of the cover panel relative to the base member.
Figure 6:
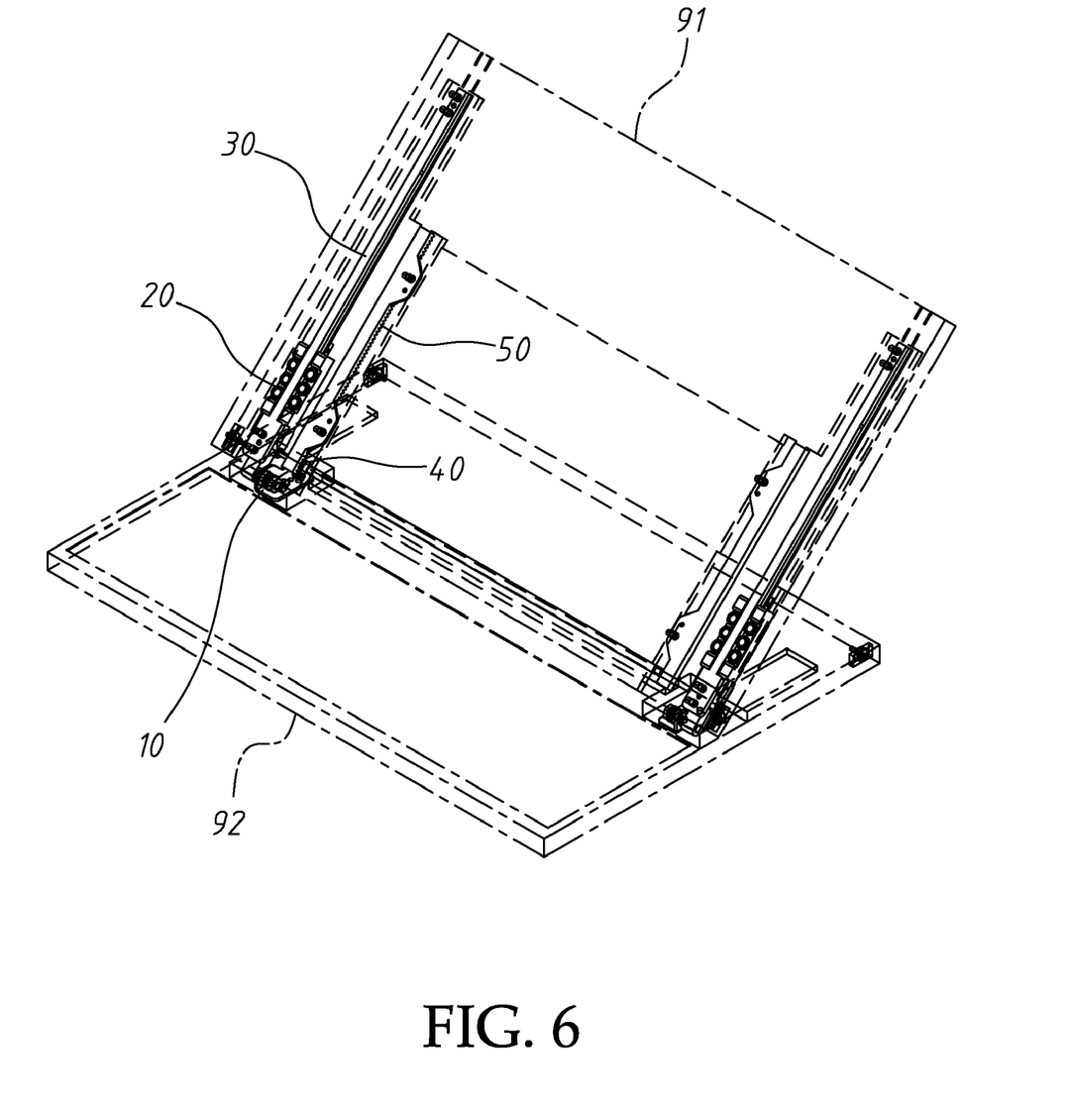
FIG. 6 is a schematic drawing of the present invention, illustrating the cover panel lifted to a tilted position relative to the base member.
Figure 7:
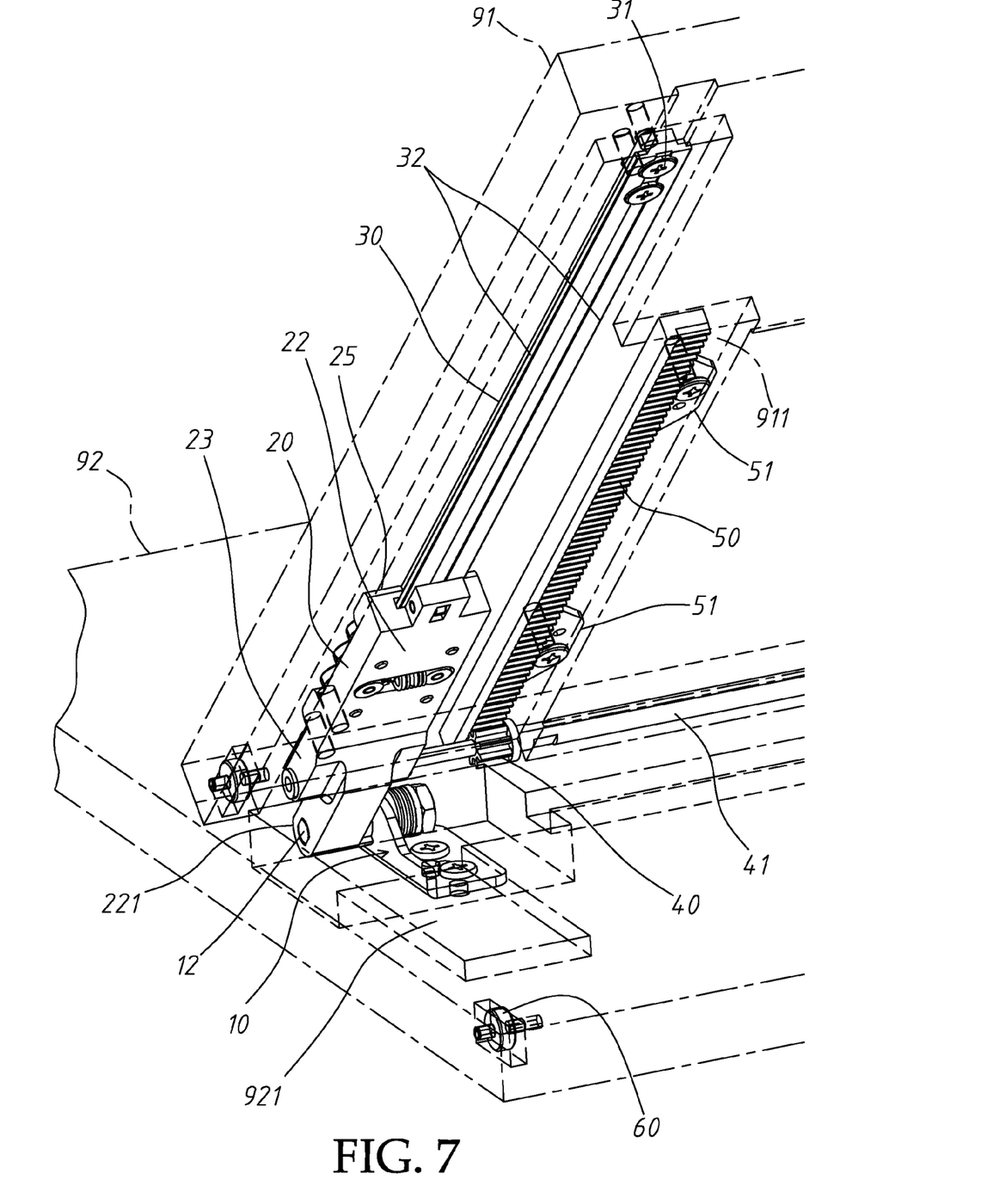
FIG. 7 corresponds to FIG. 6 when viewed from another angle.

Further, as shown in FIG. 5, the cover panel 91 can be forced by a biasing force in the direction indicated by arrowhead sign G2 to turn about the pivot shafts 12 of the hinges 10 and away from the base member 92 to a tilted position shown in FIG. 6. During biasing of the cover panel 91, the gears 40 are constantly kept in mesh with the gear racks 50, as shown in FIG. 7.

Further, rollers 60 are respectively pivotally mounted in the two opposing front corners of the top wall of the base member 92 and the two opposing rear corners of the bottom surface of the cover panel 91. Subject to the functioning of these four rollers 60, the sliding gap between the cover panel 91 and the base member 92 is maintained constant, avoiding biasing of the cover panel 91 during its sliding movement.

In conclusion, the invention provides a slide cover mounting structure, which has the advantages as follows:

1. When the invention is used in a tablet computer, the two rollers 60 at the base member 92 (the operating system end) and the two rollers 60 at the cover panel 91 (LCD display panel) keep a constant sliding gap between the cover panel 91 and the base member 92, avoiding biasing of the cover panel 91 during its sliding movement.

2. Subject the effect of the gears 40 and the gear racks 50 and the connection arrangement of the fixed gear shafts 41 of the between the gears 40, applied horizontal push force can be evenly transferred from the cover panel 91 to the two opposite lateral sides of the base member 92, avoiding biasing of the cover panel 91 during its sliding movement.

3. Subject to connection between the fixed gear shafts 41 of the two gears 40 and the two sliding rail holders 20, the cover panel 91 is constantly kept in balance when moved.

4. The gears 40 are constantly kept in mesh with the respective gear racks 50, avoiding accidental disengagement when lifting the cover panel 91.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A slide cover mounting structure used in an electronic device comprising a cover panel and a base member, the slide cover mounting structure comprising:

two hinges respectively fixedly mounted in a respective recessed portion on a middle part of a top wall of said base member adjacent to two opposite lateral sides of said base member, each said hinge comprising a pivot shaft;

two sliding rail holders respectively connected to the pivot shafts of said two hinges and rotatable relative to said base member, each said sliding rail holder comprising two fixed rails defining a sliding groove therebetween;

two sliding rails bilaterally fixedly mounted on a bottom surface of said cover panel in a parallel manner and respectively slidably coupled to the sliding grooves of said sliding rail holder;

two gears, each said gear being mounted on a fixed gear shaft pivotally connected between the fixed rails of said sliding rail holders; and two gear racks respectively mounted on the bottom surface of said cover panel in a parallel manner and respectively meshed with said gears;

wherein said two sliding rails are moved with said cover panel in the sliding grooves of said sliding rail holders relative to said base member when said cover panel receives a horizontal push force, and said gear racks are simultaneously moved with said cover panel to rotate said gears, enabling the horizontal push force to be transferred through the fixed gear shaft of said gears to two opposite lateral sides of said base member to prohibit said cover panel from uneven biasing during sliding movement; said gears are kept meshed with said gear racks constantly for enabling said cover panel to be turned about the pivot shafts of said hinges from a horizontal position to a tilted position relative to said base member.

2. The slide cover mounting structure as claimed in claim 1, further comprising a plurality of rollers respectively pivotally mounted in two opposing front corners of the top wall of said base member and two opposing rear corners of the bottom surface of said cover panel for enabling a constant sliding gap to be kept between said cover panel and said base member to prevent said cover panel from uneven biasing relative to said base member when said cover panel is moved horizontally relative to said base member.

3. The slide cover mounting structure as claimed in claim 1, wherein each said sliding rail holder further comprises a bottom plate fixedly connected to the pivot shaft of one said hinge for synchronous rotation with the associating pivot shaft, said two fixed rails fixedly mounted on a top wall of said bottom plate in a parallel manner; the sliding groove of each said sliding rail holder is defined at the top wall of the bottom plate between the two fixed rails of the respective sliding rail holder.

4. The slide cover mounting structure as claimed in claim 3, wherein each sliding rail holder further comprises two pairs of protruding blocks respectively located on associating fixed rails and partially suspending above the associating sliding groove, and a plurality of rollers respectively pivotally mounted on the associating fixed rails between the associating pair of protruding blocks; said sliding rails are respectively supported between the rollers on the fixed rails of the respective sliding rail holders, each rail comprising two end blocks respectively located on two distal ends thereof and affixed to one respective recessed portion on the bottom surface of said cover panel and two side flanges extending along the length in flush with a bottom wall thereof and topped below the protruding blocks of the associating sliding rail holder in the sliding groove of the associating sliding rail holder.

5. The slide cover mounting structure as claimed in claim 4, wherein said gear racks are respectively set in a respective recessed portion on the bottom surface of said cover panel in a parallel manner and respectively meshed with said gears, each gear rack comprising two protruding mounting flanges disposed at one side thereof and affixed to the bottom surface of said cover pane.

* * * * *